United States Patent
Kipnes

(10) Patent No.: US 7,661,196 B1
(45) Date of Patent: Feb. 16, 2010

(54) COMPACT ERGONOMIC THREAD INSPECTION TOOL

(76) Inventor: Hyman Jack Kipnes, 390 Oser Ave., Hauppauge, NY (US) 11788

( * ) Notice: Subject to any disclaimer, the term of this patent is extended or adjusted under 35 U.S.C. 154(b) by 75 days.

(21) Appl. No.: 12/220,284

(22) Filed: Jul. 23, 2008

(51) Int. Cl.
*G01B 5/16* (2006.01)
*G01L 3/00* (2006.01)

(52) U.S. Cl. .................... 33/199 R; 73/761; 73/862.08; 340/665

(58) Field of Classification Search ............... 33/199 B, 33/199 R, 542; 73/1.09, 761, 817, 862.08, 73/862.23; 340/665
See application file for complete search history.

(56) References Cited

U.S. PATENT DOCUMENTS

| | | | |
|---|---|---|---|
| 2,602,347 A | | 7/1952 | Miller |
| 3,799,108 A | * | 3/1974 | Mosow ......................... 73/761 |
| 4,356,636 A | * | 11/1982 | Roberts ..................... 33/199 R |
| 4,926,700 A | | 5/1990 | Peplinski |
| 5,317,809 A | | 6/1994 | Kipnes |
| 5,383,286 A | | 1/1995 | Kipnes |
| 6,351,997 B1 | * | 3/2002 | Loffler ......................... 73/761 |
| 7,059,055 B2 | | 6/2006 | Wickham et al. |
| 7,439,871 B2 | * | 10/2008 | Hsieh ......................... 340/665 |
| 7,562,589 B2 | * | 7/2009 | Anjanappa et al. ....... 73/862.23 |
| 2003/0101602 A1 | * | 6/2003 | Galestien .................. 33/199 R |
| 2007/0297868 A1 | | 12/2007 | Wickham |
| 2008/0111703 A1 | * | 5/2008 | Hsieh ......................... 340/665 |

* cited by examiner

*Primary Examiner*—G. Bradley Bennett
(74) *Attorney, Agent, or Firm*—Alfred M. Walker

(57) ABSTRACT

An ergonomic, self contained hand-held thread inspection tool is power driven, which uses current draw as a surrogate for torque to initiate automatic reversal and gage withdrawal in case of jamming. The distal end carries the thread gage attached to a motor-driven spindle. A thread depth collar sleeve, adjustable by manual turning, concentrically surrounds the thread gage. When threaded into a blind hole or onto a protruding stud and operated, the distal end of the thread depth collar sleeve comes in contact with a part, pushing it against spring force. This movement is internally sensed, causing an indicator to flash, signaling "test OK", while automatically reversing the spindle to withdraw the thread gage. If during the forward excursion of the thread gage a torque exceeding the pre-set torque limit is encountered, a buzzer is sounded signaling an over-torque problem and the spindle is simultaneously reversed for automatic gage withdrawal.

40 Claims, 7 Drawing Sheets

OPERATION
Fig. 4

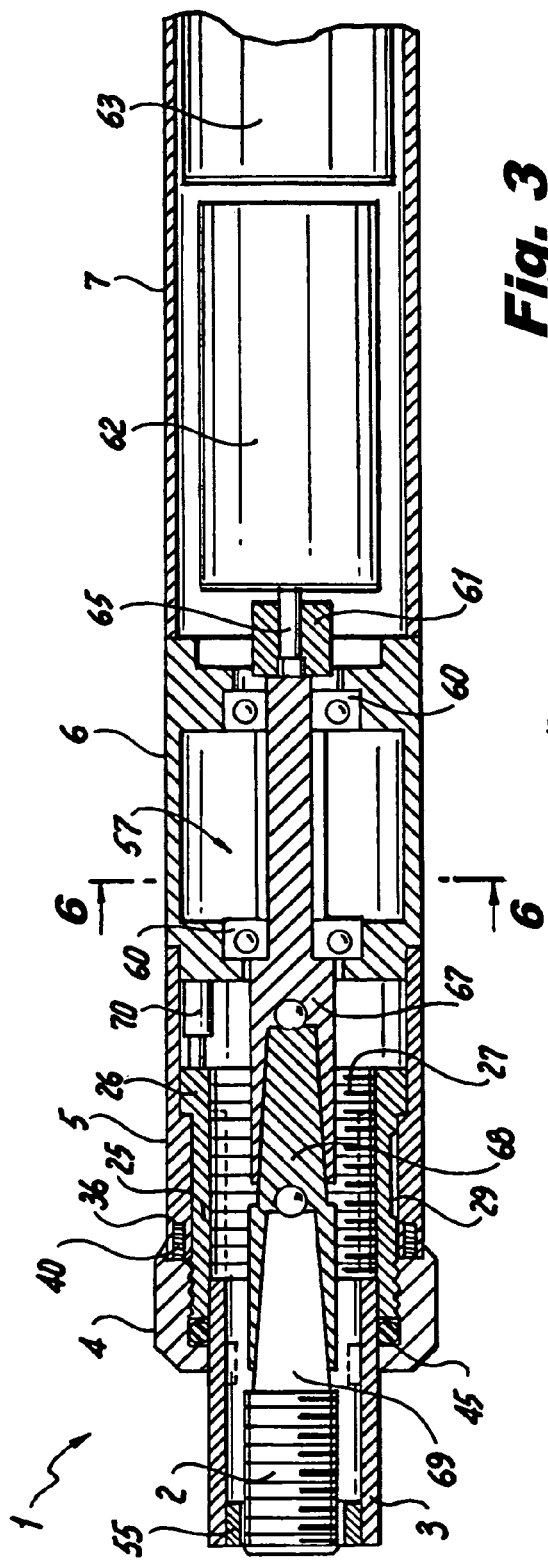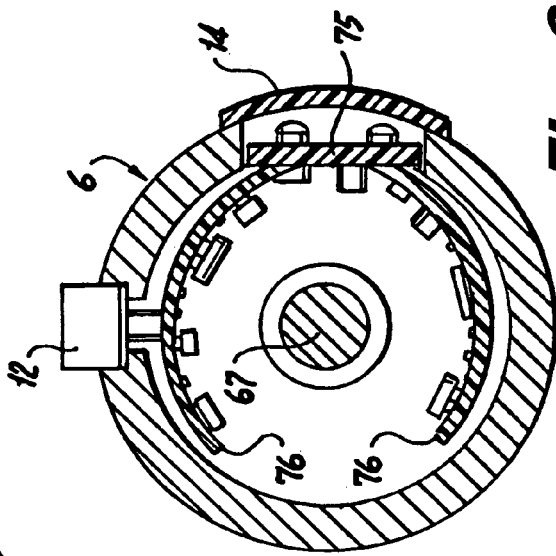

OPERATION

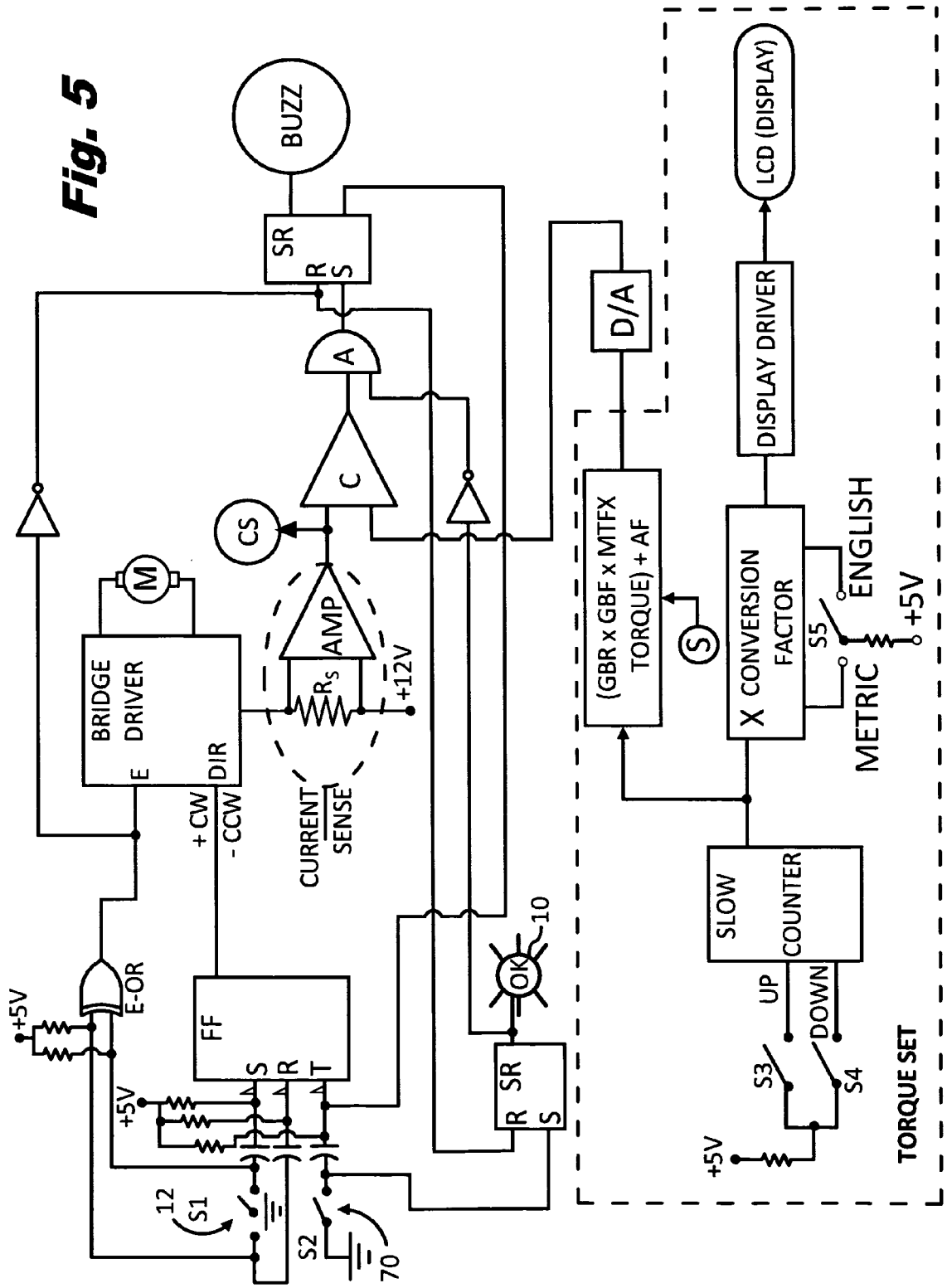

CALIBRATION

COMPACT ERGONOMIC THREAD INSPECTION TOOL

FIELD OF THE INVENTION

The present invention relates to portable thread inspection tools.

BACKGROUND OF THE INVENTION

Thread inspection is a necessary part of many manufacturing or quality control procedures. It involves the spinning of externally or internally threaded gages into threaded holes or onto threaded studs respectively. These threaded holes or studs may be integral parts of machines or perhaps just fastener parts such as nuts or bolts. Power driven spindles on which gages are fitted to facilitate rapid and uniform testing are used.

The prior art includes U.S. Pat. No. 4,926,700 of Peplinski for a blind hole thread gage using a modified commercial nut driver. This bench mounted device uses strain gages to monitor torque during testing, as well as sensing when a given hole has been tested to its proper depth. U.S. Pat. No. 7,059,055 of Wickham et al. is a commercial tester for checking thread presence in blind holes rapidly. Both single spindle and multi-spindle devices are described using adjustable slip clutches to limit the torque applied during testing. Upon detecting the proper depth of testing or upon exceeding the torque limit, the tester automatically reverses the drive motor to disengage the gage from the hole being tested.

The prior art does not reveal a compact hand-held ergonomic thread inspection tool that is power driven, and uses current draw as a surrogate for torque to initiate either automatic withdrawal or alert the user to operate the reversing switch manually in case of jamming.

OBJECTS OF THE INVENTION

It is an object of the present invention to provide a compact hand-held ergonomic thread inspection tool that is power driven, which uses current draw as a surrogate for torque to initiate automatic reversal and gage withdrawal in case of jamming.

Other objects which become apparent from the following description of the present invention.

SUMMARY OF THE INVENTION

In keeping with these objects and others which may become apparent, the present invention is a thread inspection tool which is configured as a hand-held cylindrical housing that is self-contained, including a compartment for rechargeable batteries to power the motor-driven spindle. An optional AC sourced power supply and battery charger can alternatively supply the low voltage DC power to run the thread checker via DC power cord and also simultaneously charge the batteries (if installed).

A transparent panel on the inspection tool protects adjustment switches from inadvertent operation while permitting a view of a small display showing the current torque limit setting. It can be opened to provide access to the torque adjusting switches and the metric/English units switch. Once the desired torque limit is set, any number of threaded holes, blind threaded holes, or threaded studs or bolts can be checked using the same setting.

The distal end carries the thread gage attached to a motor-driven spindle. As an ergonomic feature, a thread depth collar sleeve, simply adjustable by manual turning, concentrically surrounds the thread gage. When threaded into a blind hole or onto a protruding stud and operated, the distal end of the thread depth collar sleeve comes in contact with machine part pushing it in slightly against light spring force. This movement of less than a pre-determined threshold, such as, for example, $\frac{1}{32}$" or otherwise, is internally sensed, causing an indicator to flash, signaling "test OK", while automatically and simultaneously reversing the spindle to withdraw the thread gage. If during the forward excursion of the thread gage a torque exceeding the pre-set torque limit is encountered, a buzzer is sounded signaling an over-torque problem (such as a thread jam); the spindle is simultaneously reversed by either automatic gage withdrawal or by using the reversing switch manually. Note that when a spindle is automatically reversed either due to a thread depth limit or an over-torque indication, this reverse spindle powering is performed with full torque available since the torque limit sensing is defeated during this reverse excursion.

Since both right-hand as well as left-hand threads require inspection, the operating switch for starting the spindle turning is direction sensitive. It is, for example of one type of switch, a momentary type rocker switch, which responds to pressing the forward end by turning the spindle clockwise while pressing the rearward end causes counterclockwise rotation. Other types of switches may be used, such as toggle, slide or membrane switches. The orientation of the switch can be either front to back or side to side switch A momentary switch is used to require the operator to continually press on the switch to keep the spindle moving (even through automatic reversal) as a safety feature. The spindle will stop when pressure is removed from the rocker switch. The switch can also be used for manual reversal of the spindle motor at any time.

A DC permanent magnet gearmotor is used to turn the spindle at a slow speed, such as, for example, 150 to 200 rpm, or other desired slow speeds. This type of motor has a torque constant expressed simply in terms of oz-in/amp or N-m/amp at the motor shaft. The torque at to the output of the gear box (which spins the gage spindle) can be deduced from current draw of the motor by simply reading the current, applying the torque constant, and then multiplying by the reciprocal of the gearbox speed reduction ratio (GBR). This works well when the torque to be detected is large as compared to the parasitic no-load and running torque introduced by internal gearbox friction and lubrication viscous losses. In fact, the GBR and the motor torque constant remain stable over the life of inspection tool, and they are factors well known at gearmotor manufacture. Another constant defined here is the motor torque factor (MTF) which is the reciprocal of the motor torque constant. In addition, other relevant gear box and motor parameters are defined. By testing a number of manufactured gearmotors in a laboratory setting and averaging the results, an estimate of the gear box friction factor (GBF) as well as an additive current factor representing no-load torque (AF) can be obtained. In the preferred embodiment, the desired torque limit is combined with the other factors mentioned to better approximate the detected motor current truly representative of the desired torque limit. These constant parameters are combined in an algorithm with the desired torque to arrive at the current estimate as follows:

$$\text{limit current} = (GBR \times GBF \times MTF \times \text{Desired torque}) + AF$$

Then the motor current is continuously measured and compared with this limit current value to determine if the desired torque limit at the thread gage is exceeded.

In an alternate embodiment with extended low-end thread inspection range, the effects of the gear box are more precisely estimated in the field by establishing a built-in calibration subsystem and procedure. The GBF and AF factors are determined by the calibration procedure and then updated in the limit current algorithm used during actual inspection testing. By pressing a calibrate button and running the spindle with no load in the desired direction, the actual AF current value is measured. Since AF is correlated with GBF as per actual empirical trials by sampling and testing a number of sample units, a better estimate of GBF is obtained from an empirical table stored at the thread inspection tool as retrieved using the measured AF as an index into the table. One variable that affects gear box factors is temperature, another is gear tooth wear. Both of these variables are compensated by a periodic field calibration procedure.

As an alternative to using an algorithm to account for factors, a simple table look-up procedure using desired torque limit as an index to find estimated current can be used. If a calibration procedure is used with such a system, the calibration would enter different updated table entries derived from factory testing. These values are retrieved as a vector using the measured AF as an index.

Although space for electronic controls is limited within the inspection tool of this invention, the use of a single chip appliance grade microcomputer can substitute for discrete logic components and other peripheral chips saving board space as well as cost. In addition, the use of a flexible polyimide board substrate can extend available board area by using the curved area adjacent to the inner housing wall.

In summary, a handheld or a table countertop mounted precision thread inspection tool includes a portable, compact held elongated housing having a distal end and a proximate end. A thread gage protrudes from the distal end of the housing. A means is provided for setting a length of the thread gage extending from the distal end of the housing. A drive for the thread gage includes an electric motor in the housing and a coupling between the motor and the thread gage.

Torque produced by the electric motor as the gage is driven into a blind hole or onto a stud is monitored. when a predetermined limit of torque is exceeded, an alarm is set off and automatically the direction of rotation of the thread gage is reversed.

Preferably, the torque is monitored by monitoring current draw of the motor, which may be, for example, a DC permanent magnet gearmotor. The current draw limit is related to the predetermined torque limit by incorporating empirically determined gear box parameters, such as gear box ratio (GBR), gear box friction factor (GBF), and an additive factor (AF) in addition to the motor torque constant.

Optionally, the housing of the thread inspection tool includes a collar threaded into the distal end of the housing, wherein the thread gage is mounted within the collar and is fixed along a longitudinal axis of the housing, whereby the length of thread gage protruding out of the housing is set by manual rotation of the collar.

The housing of the thread inspection tool preferably has a mid-section with a transparent cover containing a display and switches for setting the predetermined limit of torque for forward spinning of the thread gage.

The collar of the thread inspection tool is preferably part of a sub-system mounted in the distal end of the housing, such that the sub-system is movable along the longitudinal axis of the housing and biased in a forward direction, toward the distal end of the housing. The housing has a sensor, such as, for example, a snap action switch, an optical sensor or a Hall effect switch, which detects when the sub-system overcomes the bias and is moved rearwardly a predetermined distance indicating that the thread gage no longer has forward movement, because the thread gage has moved fully into the blind hole or onto the stud. Moreover, the housing has an indicator light which flashes when a thread test is successful. The spindle is simultaneously reversed by either automatic gage withdrawal or by using the reversing switch manually The housing preferably has a momentary rocker switch for controlling operation of the motor, and preferably includes a battery as a power source for the motor, with a socket for recharging the battery or for operating the motor. Other types of switches may be used, such as toggle, slide or membrane switches. The switch can be either a front to back switch or side to side switch.

The coupling between the motor and thread gage preferably includes a spindle having a coupling. The thread gage includes a thread portion and a coupling portion, wherein the coupling portion of the thread gage engages with the spindle coupling in such a manner that the thread gage is readily replaceable with a different thread gage.

An optional field calibration procedure including pressing the rocker switch in a predetermined direction while a calibrate switch is on. This procedure obtains an actual no-load current reading at any desired time, whereafter the no-load current reading is then converted to a digital value representing a factor AF in an algorithm associated with each current reading. The field calibration procedure also uses the no-load current reading to retrieve an accurate the gear box friction factor (GBF) for the algorithm from a stored table of empirical values.

An optional table mount accessory for convenient benchtop use of the hand-held thread inspection tool of this invention is also described. It includes a base with a split round clamp attached which receives the housing of the thread inspection tool and locks it in place via a tightening screw with a knob. An adjustable rest in registration with the front end of the thread inspection tool can then be used to support the threaded unit under test.

BRIEF DESCRIPTION OF THE DRAWINGS

The present invention can best be understood in connection with the accompanying drawings. It is noted that the invention is not limited to the precise embodiments shown in drawings, in which:

FIG. 3 is a side crossectional view showing the mechanical components;

FIG. 5 is a logic flow diagram showing hardware features which can also be implemented in software using a microcomputer;

FIG. 6 is a crossectional view of the area layout for electronics using flexible polyimide board extensions;

DETAILED DESCRIPTION OF THE INVENTION

Figure 1:
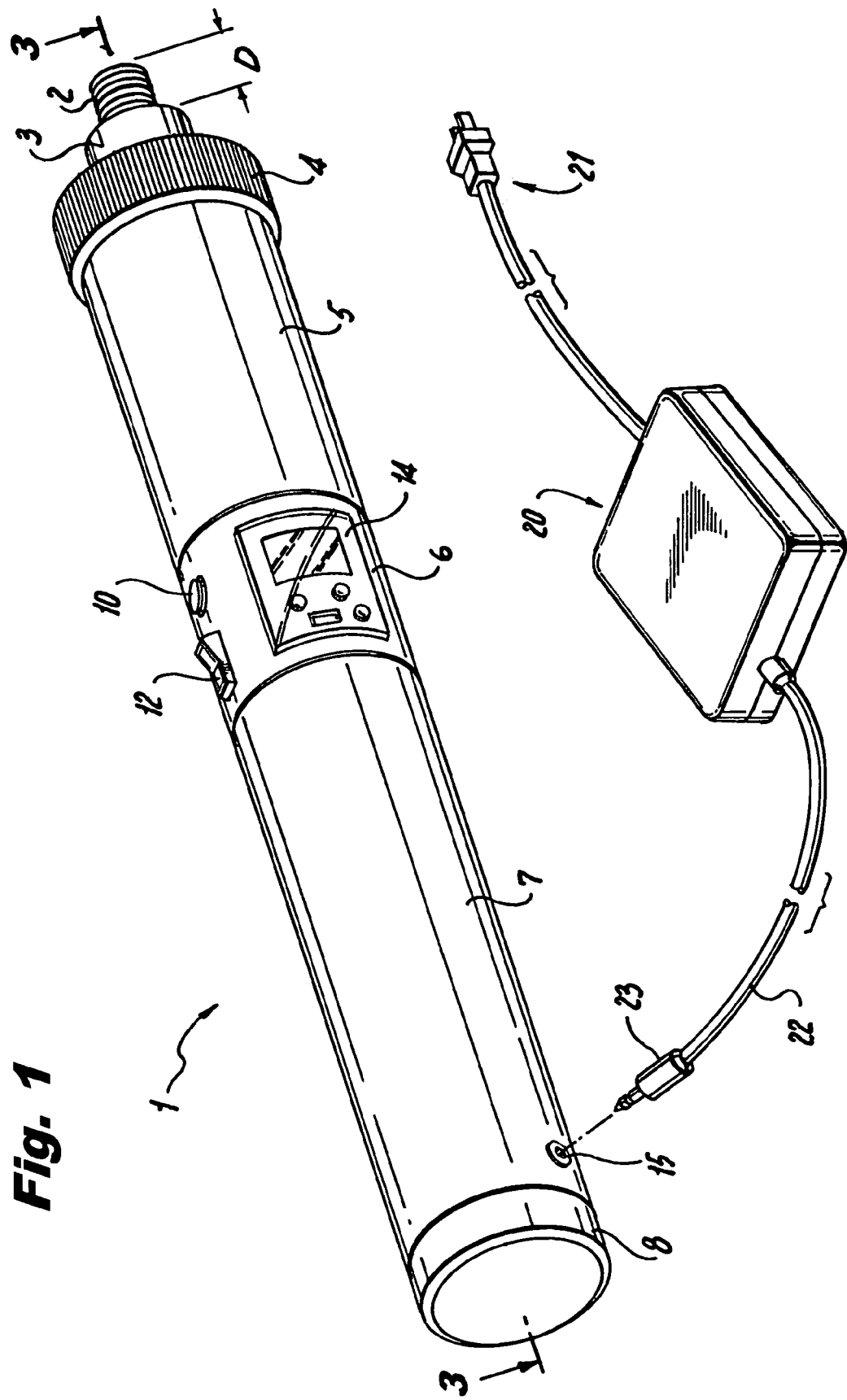
FIG. 1 is a perspective view of the thread inspection tool of this invention; also shown is optional AC sourced DC power supply and charger.

FIG. 1 shows the thread inspection tool 1 of this invention. Thread gage 2 is surrounded by depth limit collar 3 shown at a setting of "D". Item 4 is a lock nut which locks the internal parts of the depth setting subsystem located within front housing section 5 which screws into mid housing 6 which also contains electronics. Transparent cover 14 covers a liquid crystal display as well as switches which set the torque limit for forward spinning of gage 2; it is opened to make torque changes. Momentary rocker switch 12 controls spinning of the gage spindle while flashing indicator light 10 denotes a successful thread test. Other types of switches may be used, such as toggle, slide or membrane switches. The switch orientation can be either a front to back switch or side to side switch. Housing compartment 7 contains the motor, such as a gearmotor as well as a power source, such as one or more batteries, to power the inspection tool. Cap 8 permits access to batteries within. Optional socket 15 mates with DC power plug 23 on DC line 22. This supplies low voltage DC, typically 12 volts, from power supply/charger 20 which is optional. Charger 20 can charge batteries in housing 7 using plug-in AC (21) power, or it can power tool 1 directly even with batteries removed.

Figure 2:
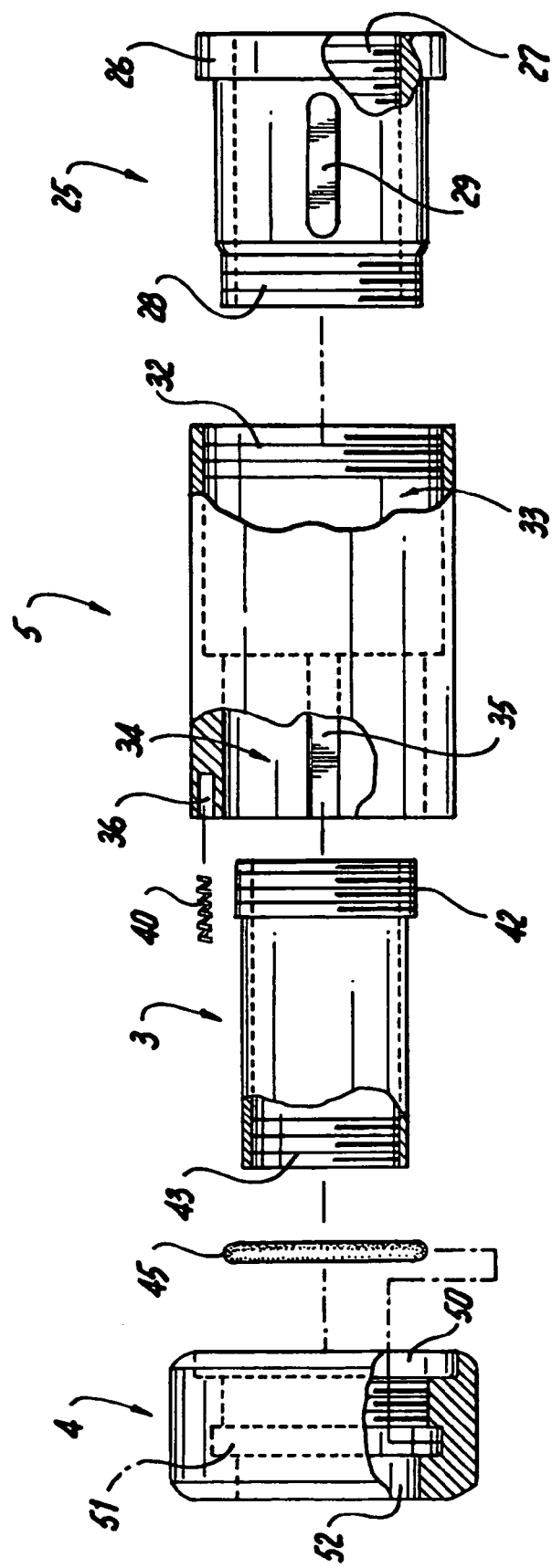
FIG. 2 is a side exploded view of the depth adjusting subsystem.

FIGS. 2 and 3 should be viewed together for better understanding. FIG. 2 shows the depth setting subsystem including several concentric hollow parts. Internal sleeve 25 has a collar 26 at its distal end, internal threads 27 for its entire length, external threads 28 at the front end, and preferably a protruding anti-rotation member, such as key 29. This fits inside housing section 5 when key 29 is in registration with internal groove 35 of housing 5 and rests with collar 26 against ridge formed by reduced diameter section 34. Internal threads 32 attach housing 5 to housing 6 section. Depth limit collar 3 has external threads 42 which engage the internal threads 27 of sleeve 25. Preferably a friction reducer, such as rubber O-ring 45 is a stretch fit onto collar 3 and also fits within region 51 of lock nut 4 with exit hole 52 permitting access for the end of collar 3. A spring ferrule can be used as a substitute for O-ring 45, thereby serving the same function. Biasing members, such as, for example, two or more small springs 40, are partially retained within radially equi-spaced holes 36 in the front end of housing section 5. They bias the subassembly including of internal sleeve 25, collar 3, O-ring 45 and lock nut 4 forward under light spring force relative to housing 5 (after lock nut 4 is tightened). If collar 3 is pressed back relative to housing 5, it can move a predetermined distance, such as, preferably, about 1/32" or other suitable distance; this is enough to trip a switch, such as, for example, snap action switch 70 (see FIG. 3). An optical sensor or a Hall-effect sensor can be used as a replacement for switch 70, but in any event the objective is to sense the movement of collar 26. FIG. 3 also shows ring 55 which can be screwed into internal threads 43 of depth limit collar 3 to provide an end surface more closely fitted around the outer diameter of gage 2. Note that collar 3 in use is non marring to the surface on which it impinges since it requires little force and it is non-rotating. Note that the use of O-ring 45 provides an optimal amount of friction when manually turning depth limit collar 3; it is easy to turn while having enough friction to maintain a setting during use.

In FIG. 3, the end of battery pack 63 is shown in a portion of housing 7 behind gearmotor 62. The shaft 65 of gearmotor 62 engages coupling 61 which engages spindle shaft 67 carried in retainers, such as two ball bearings 60, one at each end of housing section 6. The front end of spindle 67 opens into an integral female taper coupling. Note area 57 is shown empty, this is where the electronic subassembly is preferably housed. An intermediate coupling 68 is preferably used, having a male taper coupling which mates with that integral to spindle shaft 67. The front female taper of coupling 68 may be different to accommodate whatever male taper is integral to gage 2. Intermediate coupling 68 is therefore a conversion coupling. Many different such couplings are provided as needed. Lateral holes to facilitate disengagement rods are shown at the apex of female taper couplings. The entire depth limit subassembly can be unscrewed from housing 6 intact and pulled forward of gage 2 to facilitate changing gages and/or conversion couplings.

Figure 4:
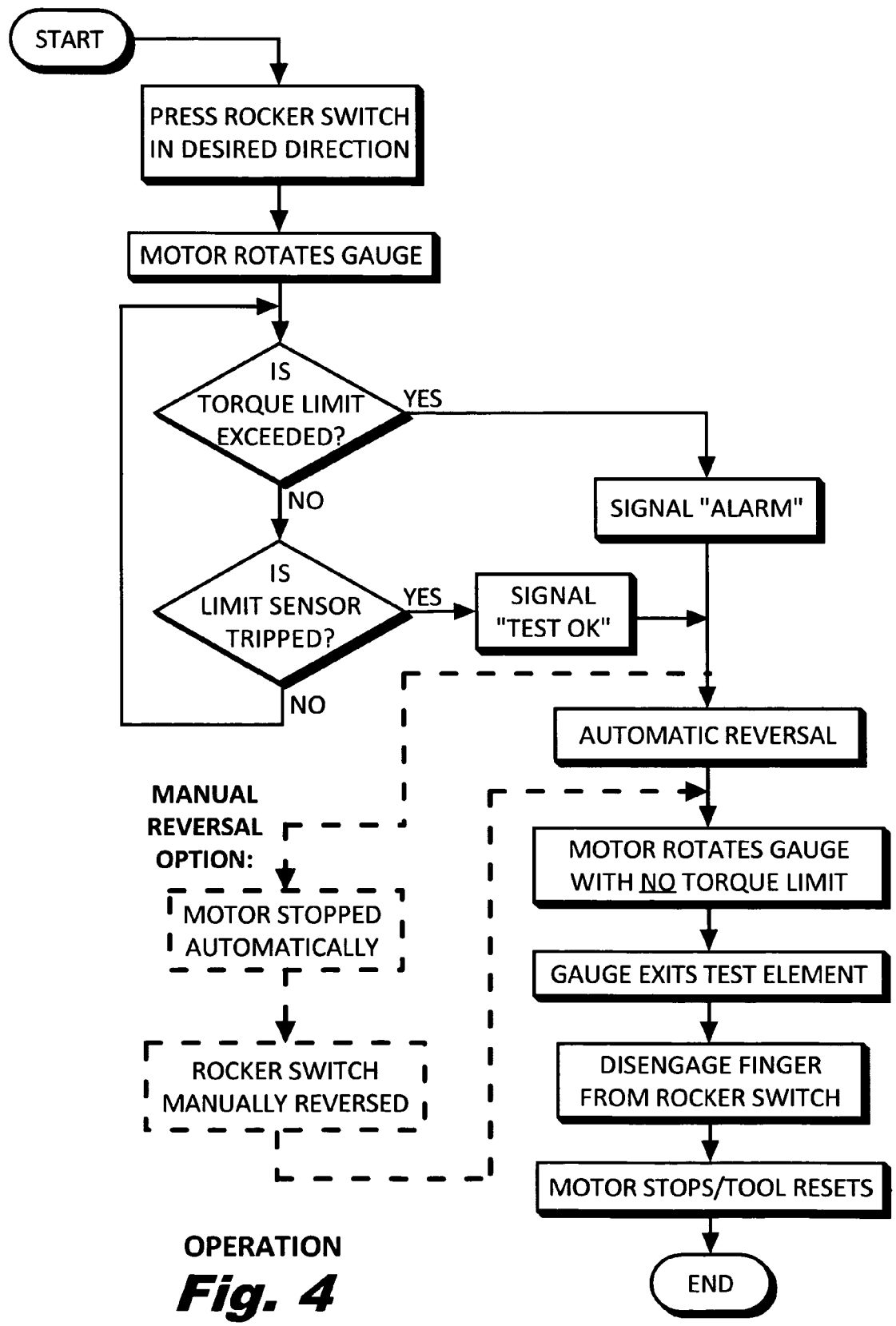
FIG. 4 is a high level operational flow chart of the thread inspection tool.

The flow chart of FIG. 4 describes the normal procedure for using the thread inspection tool of this invention. It is presumed that the torque limit for the usage had been previously set. Operation starts by pressing the rocker switch in the desired rotation direction. It remains pressed during the entire procedure. When the motor starts, the gage is placed in the blind hole or onto the stud to be tested and the rest of the procedure is automatic until the finger is released from the rocker switch. Torque is monitored during the forward motion by monitoring the current draw of the motor. If the limit is exceeded, an alarm signal (such as a buzzer) is sounded and the spindle is automatically reversed so as to turn in a direction opposite to that of the still pressed rocker switch. Alternatively, the switch is used manually for reversal after being alerted by the alarm and stopping automatically (this is shown in dashed lines in FIG. 4). The reverse direction is engaged with no torque limit. If the depth limit is encountered before any torque limit is detected, an indication of "test OK" is given (flashing light) while proceeding to an automatic reversal to withdraw the thread gage.

FIG. 5 is a logic diagram showing the preferable details of the tool operation and torque setting as if discrete hardware logic modules were used. A more cost effective and compact implementation would substitute software routines to implement equivalent logic manipulations using a single chip appliance class microcomputer. Rocker switch S1 (also shown as 12 previously) determines the direction setting of the bridge motor driver (a bulkier relay can also be used) while an exclusive OR detecting either direction engagement of switch S1 keeps the bridge driver enabled. A flip flop (FF) with set/reset/toggle inputs stores the current direction setting of the motor. The capacitors coupling the inputs insure that only initial pulses are considered. Considering only the depth limit switch S2 (previously 70), motor keeps operating in the same direction until S2 is closed which causes FF to toggle the direction input of the bridge driver thereby reversing the motor. Separately, a set/reset (SR) latch stores the fact that S2 had been closed (at least momentarily) and indicates this fact by lighting flashing light "OK" or 10. In the meantime, torque output is being monitored via the voltage across resistor Rs in series with motor supply lead (12V). This is amplified and compared with a voltage previously set representing the voltage of the desired torque limit. (Note that a Hall effect current measuring device can be used instead of the sense resistor.) If this limit is exceeded prior to switch S2 having been closed, comparator C sets a set/reset (SR) latch which sets a buzzer as a problem indicator while also keeping toggle input of FF in the low (engaged) position; the latter reverses the spindle motor and prevents further over-torque detections from interfering. Some details such as inhibits and resets have not been discussed.

The torque setting portion of FIG. 5 involve the optional use of momentary switch buttons S3 and S4 which are protected by cover 14. These cause a slow counter to cycle up or down displaying the desired torque at the spindle output on a liquid crystal display in either metric (N-M) or English units such as oz-in as set by slide switch S5. The count output "torque" is input to an algorithm solver along with known constants for gear box ratio (GBR), gear box friction factor (GBF), motor torque factor MTF, and an additive factor (AF) related to no-load current. The output is a digital value of the motor current related to the desired torque limit. This is then passed through a D/A converter to convert it to a properly scaled analog voltage for comparison in an analog comparator.

FIG. 6 is a crossectional detail showing an optional electronics board 75 with switches and display facing transparent cover 14 and components on the back side. Board 75 is attached through a hatch in the wall of housing 6. Flexible polyimide board extensions 76 can provide much more area to accommodate more electronic components thereby using the enclosed area around shaft 67 effectively.

Figure 7:
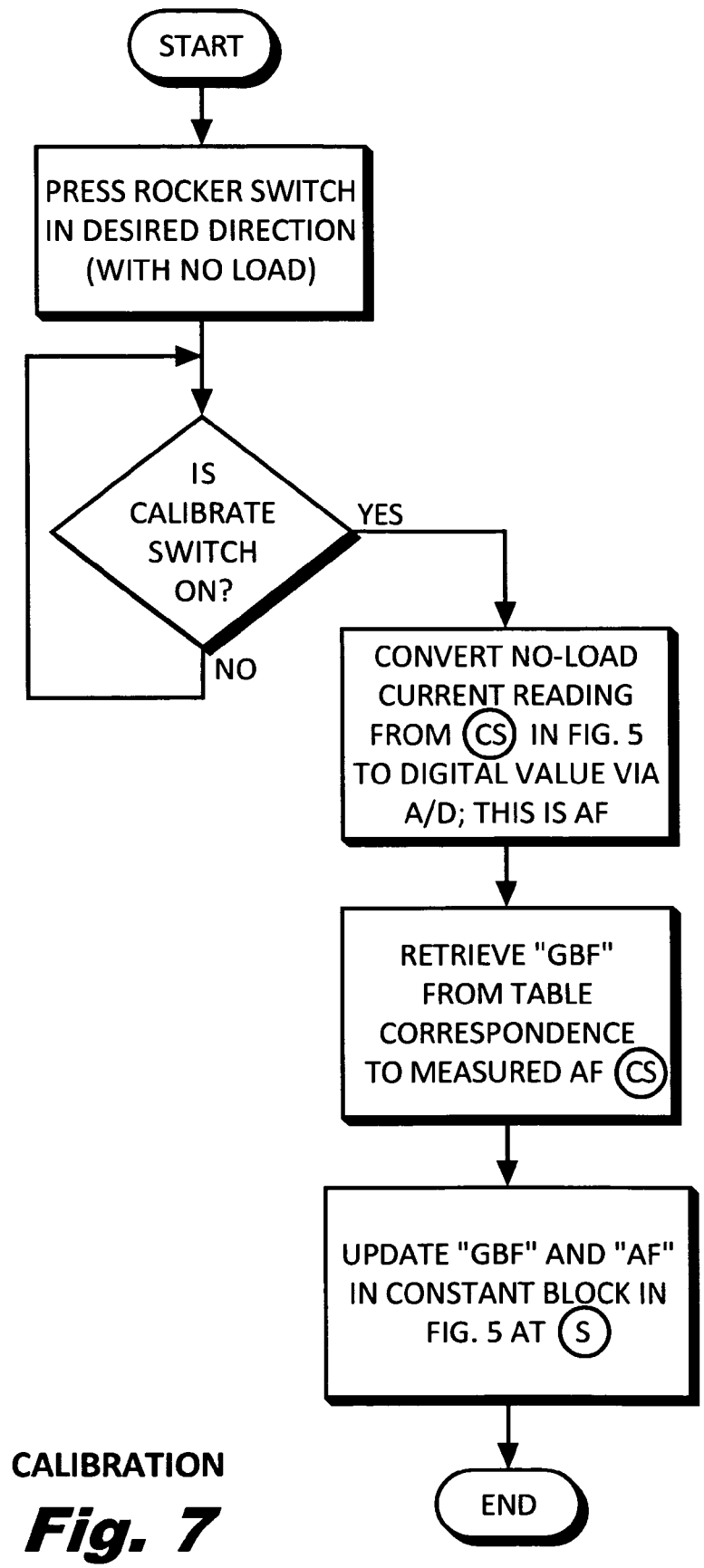
FIG. 7 is a high level flow chart of a field calibration procedure.

FIG. 7 is a flow chart showing the procedure for field calibration. This is an alternate embodiment which would be warranted only if a very wide range of desired torque limits are required in the inspection tool. This feature improves the accuracy of torque limit settings especially important for the low end of settings. It can compensate for changes in the gear box including tooth wear and loss of lubricant, or temperature variations. The operation is started by operating the rocker switch in the desired direction while the calibrate switch is on. The idea is to obtain an actual no-load current reading which can be obtained from point CS in FIG. 5. This is then converted to a digital value and becomes factor AF in the algorithm. A table of empirical values of factor GBF related to different values of AF is stored within each thread inspection tool. New value AF is used to enter the table whereby a more accurate new value of GBF is retrieved. Both the newly obtained values of AF and GBF are then inserted as constants in the algorithm solver block (at S in FIG. 5).

Figure 8:
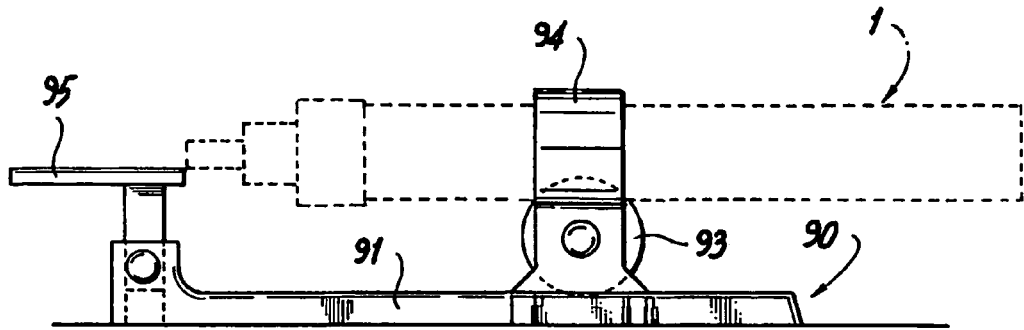
FIG. 8 is a side elevation of the table mount accessory showing the position of the thread inspection tool within the mount in dashed lines.
Figure 9:
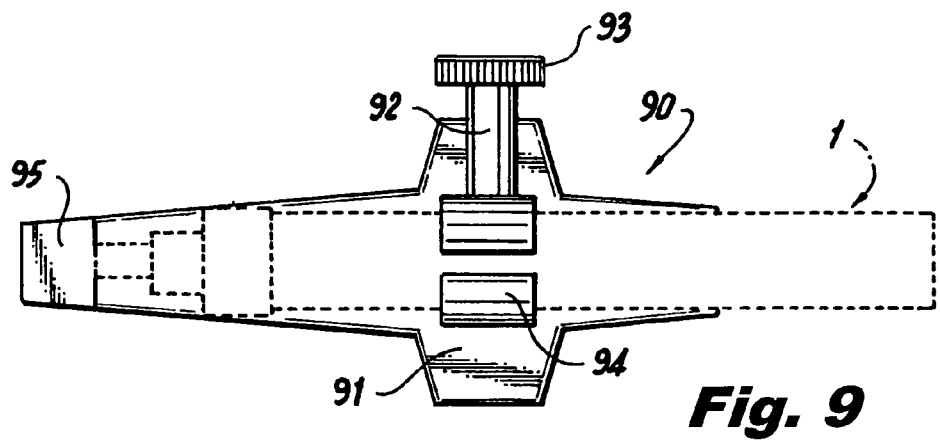
FIG. 9 is a top view of the table mount of FIG. 8.
Figure 10:
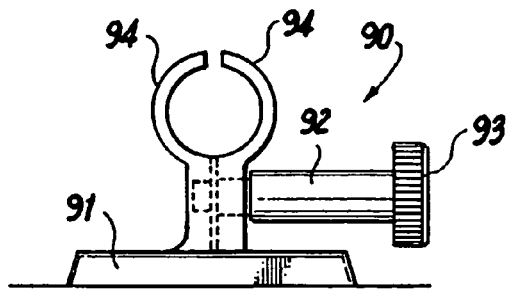
FIG. 10 is a back end view of the table mount accessory with no inspection tool in place.

An accessory table mount 90 is shown in three orthogonal views in FIGS. 8-10. It converts thread inspection tool 1 from a hand-held unit to one that can be conveniently used on a table or bench top. Table mount 90 has base 91, threaded shaft 92 with knob 93 at its distal end, split clamp 94, and adjustable front rest 95. In operation, with clamp 94 loosened, thread inspection tool 1 is inserted through the circular opening and secured by tightening shaft 92 via knob 93. Tool 1 is positioned so that its front end is in registration laterally and above adjustable rest 95 which is intended to be of aid in supporting the unit under test.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A thread inspection tool comprising:
   a portable, compact held elongated housing having a distal end and a proximate end;
   a thread gage protruding from said distal end of said housing;
   means for setting a length of said thread gage extending from said distal end of said housing;
   a drive for said thread gage comprising an electric motor in said housing and a coupling between said motor and said thread gage;
   means for monitoring torque produced by said electric motor as said gage is driven into a blind hole or onto a stud; and
   means for setting off an alarm and automatically reversing direction of rotation of said thread gage when a predetermined limit of torque is exceeded.

2. The thread inspection tool of claim 1 in which said torque is monitored by monitoring current draw of said motor.

3. The thread inspection tool of claim 2 in which said motor is a DC permanent magnet gearmotor.

4. The thread inspection tool of claim 3 in which said current draw limit is related to said predetermined torque limit by incorporating empirically determined gear box parameters comprising gear box ratio (GBR), gear box friction factor (GBF), and an additive factor (AF) in addition to the motor torque constant.

5. The thread inspection tool of claim 2 in which said housing includes a collar threaded into the distal end of said housing, said thread gage being mounted within said collar and fixed along a longitudinal axis of said housing, whereby said length of thread gage protruding out of said housing is set by manual rotation of said collar.

6. The thread inspection tool of claim 5 in which said housing has a mid-section with a transparent cover containing a display and switches for setting said predetermined limit of torque for forward spinning of said thread gage.

7. The thread inspection tool of claim 6 in which said collar is part of a sub-system mounted in said distal end of said housing, said sub-system being movable along said longitudinal axis of said housing and biased in a forward direction toward said distal end of said housing, said housing having a sensor which detects when said sub-system overcomes said bias and is moved rearwardly a predetermined distance indicating that said thread gage no longer has forward movement because said thread gage has moved fully into said blind hole or onto said stud.

8. The thread inspection tool as in claim 7 wherein said sensor is a snap action switch.

9. The thread inspection tool as in claim 7 wherein said sensor is an optical sensor.

10. The thread inspection tool as in claim 7 wherein said sensor is a Hall effect switch.

11. The thread inspection tool of claim 7 in which said housing has an indicator light which flashes when a thread test is successful.

12. The thread inspection tool of claim 3 in which said housing has a momentary rocker switch for controlling operation of said motor.

13. The thread inspection tool of claim 1 in which said housing contains a battery as a power source for said motor.

14. The thread inspection tool of claim 13 in which said housing has a socket for recharging said battery or for operating said motor.

15. The thread inspection tool of claim 11 in which said coupling between said motor and thread gage includes a spindle having a coupling, said thread gage comprising a thread portion and a coupling portion, said coupling portion of said thread gage being engaged with said spindle coupling in such a manner that said thread gage is readily replaceable with a different thread gage.

16. The thread inspection tool as in claim 12 further comprising a field calibrator procedure including said rocker switch pressed in a predetermined direction while a calibrate switch is on, said procedure obtaining an actual no-load current reading at any desired time, said no-load current reading being then converted to a digital value representing a factor AF in an algorithm associated with each current reading.

17. The thread inspection tool as in claim 16 wherein said field calibrator procedure also uses said no-load current reading to retrieve an accurate said gear box friction factor (GBF) for said algorithm from a stored table of empirical values.

18. The thread inspection tool as in claim 1 wherein said housing is hand-held.

19. The thread inspection tool as in claim 1 wherein said tool is mounted upon a countertop support.

20. The thread inspection tool as in claim 19 wherein said countertop support comprises a base having a clamp receiving said housing of said thread inspection tool, said clamp have a tightening means locking said thread inspection tool in place; said base further having an adjustable rest in positional registration with a front end of said thread inspection tool supporting a threaded unit under test.

21. A thread inspection tool comprising:
a portable, compact held elongated housing having a distal end and a proximate end;
a thread gage protruding from said distal end of said housing;
means for setting a length of said thread gage extending from said distal end of said housing;
a drive for said thread gage comprising an electric motor in said housing and a coupling between said motor and said thread gage;
means for monitoring torque produced by said electric motor as said gage is driven into a blind hole or onto a stud; and
means for setting off an alarm and automatically stopping thereby permitting manual operation of a switch for reversing direction of said thread gage when a predetermined limit of torque is exceeded.

22. The thread inspection tool of claim 21 in which said torque is monitored by monitoring current draw of said motor.

23. The thread inspection tool of claim 22 in which said motor is a DC permanent magnet gearmotor.

24. The thread inspection tool of claim 23 in which said current draw limit is related to said predetermined torque limit by incorporating empirically determined gear box parameters comprising gear box ratio (GBR), gear box friction factor (GBF), and an additive factor (AF) in addition to the motor torque constant.

25. The thread inspection tool of claim 22 in which said housing includes a collar threaded into the distal end of said housing, said thread gage being mounted within said collar and fixed along a longitudinal axis of said housing, whereby said length of thread gage protruding out of said housing is set by manual rotation of said collar.

26. The thread inspection tool of claim 25 in which said housing has a mid-section with a transparent cover containing a display and switches for setting said predetermined limit of torque for forward spinning of said thread gage.

27. The thread inspection tool of claim 26 in which said collar is part of a sub-system mounted in said distal end of said housing, said sub-system being movable along said longitudinal axis of said housing and biased in a forward direction toward said distal end of said housing, said housing having a sensor which detects when said sub-system overcomes said bias and is moved rearwardly a predetermined distance indicating that said thread gage no longer has forward movement because said thread gage has moved fully into said blind hole or onto said stud.

28. The thread inspection tool as in claim 27 wherein said sensor is a snap action switch.

29. The thread inspection tool as in claim 27 wherein said sensor is an optical sensor.

30. The thread inspection tool as in claim 27 wherein said sensor is a Hall effect switch.

31. The thread inspection tool of claim 27 in which said housing has an indicator light which flashes when a thread test is successful.

32. The thread inspection tool of claim 23 in which said housing has a momentary rocker switch for controlling operation of said motor.

33. The thread inspection tool of claim 21 in which said housing contains a battery as a power source for said motor.

34. The thread inspection tool of claim 23 in which said housing has a socket for recharging said battery or for operating said motor.

35. The thread inspection tool of claim 31 in which said coupling between said motor and thread gage includes a spindle having a coupling, said thread gage comprising a thread portion and a coupling portion, said coupling portion of said thread gage being engaged with said spindle coupling in such a manner that said thread gage is readily replaceable with a different thread gage.

36. The thread inspection tool as in claim 32 further comprising a field calibrator procedure including said rocker switch pressed in a predetermined direction while a calibrate switch is on, said procedure obtaining an actual no-load current reading at any desired time, said no-load current reading being then converted to a digital value representing a factor AF in an algorithm associated with each current reading.

37. The thread inspection tool as in claim 36 wherein said field calibrator procedure also uses said no-load current reading to retrieve an accurate said gear box friction factor (GBF) for said algorithm from a stored table of empirical values.

38. The thread inspection tool as in claim 21 wherein said housing is hand-held.

39. The thread inspection tool as in claim 21 wherein said tool is mounted upon a countertop support.

40. The thread inspection tool as in claim 39 wherein said countertop support comprises a base having a clamp receiving said housing of said thread inspection tool, said clamp have a tightening means locking said thread inspection tool in place; said base further having an adjustable rest in positional registration with a front end of said thread inspection tool supporting a threaded unit under test.

* * * * *